US009930825B2

(12) United States Patent
Hilvers et al.

(10) Patent No.: US 9,930,825 B2
(45) Date of Patent: Apr. 3, 2018

(54) APPARTUS FOR RESIZING ONE OR MORE PARTICLES

(71) Applicant: UNVERFERTH MANUFACTURING COMPANY, INC., Kalida, OH (US)

(72) Inventors: Michael J. Hilvers, Fort Jennings, OH (US); David R. Smith, Fort Jennings, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 86 days.

(21) Appl. No.: 14/887,038

(22) Filed: Oct. 19, 2015

(65) Prior Publication Data

US 2016/0114353 A1    Apr. 28, 2016

Related U.S. Application Data

(60) Provisional application No. 62/067,695, filed on Oct. 23, 2014.

(51) Int. Cl.
| | |
|---|---|
| *B05C 19/00* | (2006.01) |
| *A01C 1/06* | (2006.01) |
| *A01C 7/00* | (2006.01) |
| *B01J 2/00* | (2006.01) |
| *B01J 2/04* | (2006.01) |

(52) U.S. Cl.
CPC .................. *A01C 1/06* (2013.01); *A01C 7/00* (2013.01); *B01J 2/006* (2013.01); *B01J 2/04* (2013.01); *B05C 19/00* (2013.01)

(58) Field of Classification Search
USPC ......... 118/301, 308; 222/236, 240–242, 333, 222/406, 410; 427/180
See application file for complete search history.

(56) References Cited

U.S. PATENT DOCUMENTS

| | | | | |
|---|---|---|---|---|
| 4,586,459 | A * | 5/1986 | Schultz .................... | A01C 1/08 118/303 |
| 6,148,748 | A * | 11/2000 | Bardi ..................... | A01C 7/081 111/174 |
| 6,325,588 | B1 * | 12/2001 | Nolin ..................... | B65G 33/00 192/30 R |
| 7,487,892 | B1 | 2/2009 | Hirsch | |
| 8,556,129 | B1 * | 10/2013 | Hirsch .................. | G01F 13/005 222/236 |

* cited by examiner

*Primary Examiner* — Yewebdar T Tadesse
(74) *Attorney, Agent, or Firm* — Rothwell, Figg, Ernst & Manbeck, P.C.

(57) ABSTRACT

A device for coating items is provided. The device includes a hopper configured to hold particles of coating. The device also includes a spout including a first end and a second end. The spout is coupled to the hopper at the first end and is configured to receive the particles of coating from the hopper. The device also includes a distribution device coupled between the hopper and the spout and configured to distribute the particles of coating from the hopper into the spout at the first end of the spout. The device also includes a size adjuster device coupled to the second end of the spout. The size adjuster device is configured to resize the particles of coating and to discharge the particles of coating.

12 Claims, 2 Drawing Sheets

APPARATUS FOR RESIZING ONE OR MORE PARTICLES

CROSS REFERENCE TO RELATED APPLICATIONS

This application claims priority to U.S. Provisional Application No. 62/067,695, entitled "Apparatus for resizing one or more particles," filed Oct. 23, 2014, the disclosure of which is incorporated here in its entirety.

BACKGROUND OF THE INVENTION

Field of the Invention

The present invention relates to the field of resizing particles of coating.

Description of the Background Art

In various industries (e.g., agricultural, manufacturing, etc.), particles of coating are used for coating items used in different processing applications. For example, in the agricultural industry, a seed is coated with a material so as to assist in the planting of the seed into the ground. In the agricultural industry, coating an item is also known as treating the item.

Prior to coating an item, multiple particles of coating can stick, clump, and/or coagulate together at various temperature or humidity levels when being transported through equipment. The particles of coating then exit the equipment in clumps instead of being in a fine granular state. For example, in the agricultural industry, seeds are transported to a planting machine using a conveyor. A chemical applicator coupled to a seed tender may apply an additive such as graphite, talc, inoculant, fluency agent, or similar products to the seeds before they are transported to the planting machine for efficient and accurate planting of the seeds. The additive may include a powdery lubricant in order to lubricate the seed planting metering mechanism. Such powdery lubricants are prone to clumping, which can decrease the consistency of the coating.

While there are existing ways to prevent particles of coating from clumping together, there is no present solution that allows for different types and sizes of particles of coating to be resized prior to introducing the particles of coating to a stream of seeds for even coating.

SUMMARY OF THE INVENTION

In accordance with aspects of the invention, a device for coating items is provided. The device includes a hopper configured to hold particles of coating. The device further includes a spout including a first end and a second end, wherein the spout is coupled to the hopper at the first end and is configured to receive the particles of coating from the hopper. The device further includes a distribution device coupled between the hopper and the spout and configured to distribute the particles of coating from the hopper into the spout at the first end of the spout. The device further includes a size adjuster device coupled to the second end of the spout. The size adjuster is configured to resize the particles of coating and to discharge the particles of coating.

In some embodiments, the device further includes a flighting disposed within the spout and configured to convey the particles of coating to the size adjuster. In some embodiments, the device further includes a motor configured to rotate the flighting. In some embodiments, the flighting is helical in shape. In some embodiments the size adjuster device includes a screen having one or more sides and the one or more sides include a plurality of holes. In some embodiments, the plurality of holes each have a same dimension. In some embodiments, the distribution device is selected from the group comprising a sprayer, an injector, a nozzle, and a funnel. In some embodiments, the spout is flexible and has a circular cross-section. In some embodiments, the size adjuster device is detachable.

In accordance with aspects of the invention, a method for coating items is provided. The method includes providing a device for coating items. The device includes a hopper configured to hold particles of coating. The device further includes a spout including a first end and a second end, wherein the spout is coupled to the hopper at the first end and is configured to receive the particles of coating from the hopper. The device further includes a distribution device coupled between the hopper and the spout and configured to distribute the particles of coating from the hopper into the spout at the first end of the spout. The device further includes a size adjuster device coupled to the second end of the spout. The size adjuster is configured to resize the particles of coating and to discharge the particles of coating. The method further includes receiving in the hopper a plurality of particles of coating, wherein the particles of coating are subject to clumping together. The method further includes transporting the plurality of particles from the hopper to the spout using the distribution device. The method further includes transporting the plurality of particles from the spout to the size adjuster device. The method further includes adjusting the size of the plurality of particles using the size adjuster device. The method further includes discharging the plurality of particles.

In some embodiments where the device includes a flighting disposed within the spout and configured to convey the particles of coating to the size adjuster, the plurality of particles transported from the spout to the size adjuster device are transported by means of the flighting.

DETAILED DESCRIPTION

Figure 1:
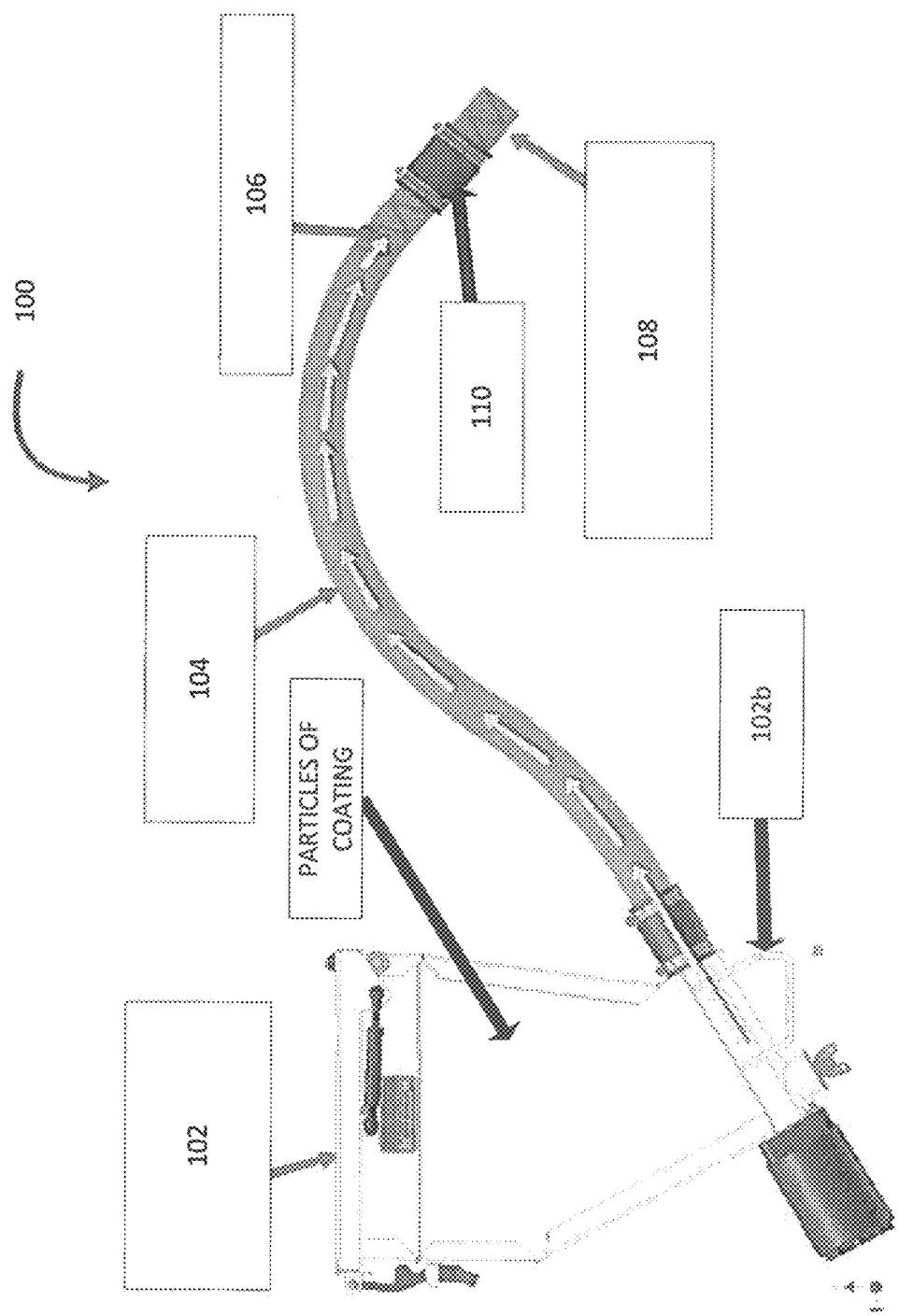
FIG. 1 is an example view of a machine in accordance with aspects of the present invention.

Apparatus, systems, and methods described herein separate and resize multiple particles of coating that clump together when being transported. Embodiments of the present invention: (i) receive multiple particles of coating; (ii) transport the multiple particles of coating through the transportation device; (iii) change the size of one or more of the multiple particles of coating using a resizing device if multiple particles of coating become clumped/aggregated together; and (iv) discharge the multiple particles of coating as individual particles of coating from the resizing device. The individual particles of coating can be evenly applied to seeds that are being transported, for example, by a conveyer belt device, such as a conveyor belt device found on a seed tender.

Embodiments of the present invention allow for resizing and/or separating multiple particles of coating by taking into consideration the type of coating and/or the size of the coating particles. In embodiments, the type of particles of coating may be graphite, talc, an inoculant, a fluency agent, and/or any other type of material that can be adjusted for size.

Embodiments of the present invention may include chemical applicators for farming equipment. Examples of chemical applicators include those described in co-owned U.S. patent application Ser. No. 14/011,547, entitled "Chemical Applicator for Farming Applications," filed on Aug. 27, 2013, the disclosure of which is incorporated here in its entirety. Embodiments of the present invention may be used with and/or part of farm equipment, such as seed tenders, and may be used to lubricate seed being conveyed by a seed tender.

In embodiments, the resizing device, or size adjuster device, can include a screen, a basket, a container with multiple holes/apertures, and/or any other type of apparatus that results in resizing particles of coating. In embodiments, the transportation device can include a screw/flighting apparatus, a blade, a wire, and/or any other apparatus that can move the particles of coating towards the resizing device for resizing.

Embodiments of the present invention allow for a highly adaptable apparatus, system, and/or method for changing the size of a variety of different types of particles of coating by making one or more changes to how particles of coating are transported and how the particles of coating are adjusted for size.

While the examples below provide descriptions of detailed embodiments, the invention is not intended to be limited in scope of interpretation to any particular embodiment. Rather, the examples are non-limiting and other embodiments within the scope of the invention may be implemented. Thus, while the term "particle" may be used to describe a portion of coating, other terms may be used, such as "an item," "an element," "a product," "an article,” and/or any other term, can be used to describe a portion of coating. Also, while the term “coating” is used, other terms may be used such as “coating material,” “additive,” etc. Additionally, or alternatively, while the transportation and size adjustment system may be associated with the agricultural industry, the transportation and size adjustment system may be associated with other processes, such as particles of coating used in the pharmaceutical industry, particles of coating used in the food processing industry, etc.

FIG. 1 is an example view of a transportation and size adjustment system 100 in accordance with aspects of the present invention. As shown in FIG. 1, the transportation and size adjustment system 100 is an apparatus that includes a hopper 102, a distribution unit 102*b*, a spout 104, a flighting 106, a size adjuster 108, and a connector 110. In embodiments, spout 104 can be referred to as a conduit that allows for clumped particles of coating to be reduced in size and/or separated into individual particles of coating when they exit a distal end of the conduit where size adjuster 108 is located.

In embodiments, hopper 102 is an apparatus that contains particles of coating. In embodiments, hopper 102 can be any type of container (e.g., a plastic container, a metal container, a container made of both plastic and metal) that can hold the particles of coating. In embodiments the particles of coating may be a solid material, a material that is permanently changed from liquid to solid state, or vice-versa, and/or any other type of material.

In embodiments, hopper 102 distributes the particles of coating into spout 104. In embodiments, hopper 102 uses distribution unit 102*b* to distribute the particles of coating into spout 104. In embodiments, distribution unit 102*b* may distribute particles of coating. In embodiments, distribution unit 102*b* can be a sprayer, an injector, a nozzle, a funnel, etc.

In embodiments, spout 104 (also referred to as a transportation device or as a conduit) transports the particles of coating from the location of hopper 102 to size adjuster 108 which is located at one end of spout 104. In embodiments, spout 104 can be made out of any material, such as a plastic derived material, a metal derived material, and/or a hybrid of different types of materials, and in some embodiments the material allows spout 104 to be flexible so that it can be positioned in any direction or configuration relative to the hopper 102. In embodiments, a cross-sectional end view of spout 104 (not shown in FIG. 2) can be circular, hexagonal, rectangular, triangular, and/or any other type of shape configuration which allows for particles of coating to be transported through spout 104.

In embodiments, flighting 106 (also referred to as a flighting device) receives particles of coating and transports the particles of coating through size adjuster 108. In embodiments, flighting 106 can be the same length as spout 104, less than the length of spout 104, or greater than the length of spout 104. In embodiments, flighting 106 is a part of size adjuster 108. Thus, if size adjuster 108 is removable from spout 104, flighting 106 is also removed from spout 104. In alternate embodiments, size adjuster 108 is part of spout 104. Thus, if size adjuster 108 is removable from spout 104, flighting 106 is not removed from spout 104.

In embodiments, and as shown in FIG. 1, flighting 106 is a helical/screw-like shape that can transport the particles of coating a particular distance to size adjuster 108 so that the particles of coating are pushed against a face of size adjuster 108. In embodiments, flighting 106 can be connected to a screw or auger conveyer to allow movement of flighting 106. As will be described further, in embodiments, the pushing of the particles of coating against the face of size adjuster 108 by flighting 106 results in the resizing of one or more particles of coating. In embodiments, flighting 106 is helical shape and rotates either clockwise or counter-clockwise based on a perspective view from the end-face of size adjuster 108. In embodiments, flighting 106, with the helical shape, can be a conic helix which is a spiral on a conic surface, with the distance to the apex as an exponential function of the angle indicating direction from the axis. Alternatively, flighting 106, with the helical shape, can be a circular helix having a constant radius, constant band curvature, and a constant torsion.

In embodiments, flighting 106 can be plastic-based, metal-based, or a hybrid of different materials. While FIG. 1 shows flighting 106 as being helical in shape, flighting 106 can also be of other types of shapes. In embodiments, flighting 106 can be a funnel, a blade, a brush, a wire, and/or any other type of shape that can transport particles of coating towards size adjuster 108. In embodiments, flighting 106 is moveable. In embodiments, flighting 106 moves in the same direction as spout 104 by using a motor or other device that can push, retract, and/or rotate flighting 106. In embodiments, flighting 106 may be coiled around a shaft that is rotated by a motor which causes flighting 106 to rotate and move particles of coating towards size adjuster 108. In embodiments, the motor can be located at an end of spout 104 that is different from the end where size adjuster 108 is located.

In embodiments, size adjuster 108 (also referred to as a resizing device or as a size adjuster device) is an apparatus, located at the distal end of spout 104 (a conduit) that is detachable from spout 104. In alternate embodiments, size adjuster 108 receives particles of coating at one size and resizes and/or separates one or more of the particles of coating as they are pushed through holes/apertures (also be referred to as openings) present on the body of size adjuster 108. In embodiments, size adjuster 108 is connected to spout 104 by using connector 110 which is shown as a sleeve in FIGS. 1 and 2. In embodiments, connector 110 is removable along with size adjuster 108 from spout 104 or is a part of spout 104. In embodiments, connector 110 can include a latch, slot, screws, pins, or any other device to connect size adjuster 108 to spout 104.

In embodiments, size adjuster 108 includes flighting 106 which is connected to size adjuster 108 via connector 110. In embodiments, the sides and/or the face of size adjuster 108 can have multiple holes/apertures. In embodiments, the holes/apertures can all be of the same size or can be of different sizes. For example, the sides of the size adjuster 108 may have holes/apertures that are of a different size than the holes/apertures that are on the face/end of size adjuster 108. In embodiments, size adjuster 108 only has holes/apertures on the sides and not on the face/end of size adjuster 108. In alternate embodiments, size adjuster 108 only has holes/apertures on the face/end and not on the sides of size adjuster 108. Thus, the locations of the holes/apertures allow for the discharge of particles of coating from the size adjuster 108 in one or more directions.

In embodiments, the shape of the hole/apertures can be based on the desired shape of the particles of coating to be distributed into a stream of seeds. For example, if the desired particles of coating are spherical in shape, the holes/apertures are circular in shape. While some of the particles of coating are adjusted in size, some of the particles of coating are already the desired size and may, for example, exit the holes/apertures of size adjuster 108 without any change in size or for the need be separated from other particles of coating.

In embodiments, and as shown in FIG. 1, size adjuster 108 is a cylinder. In alternate embodiments, size adjuster 108 can be a pyramid shape, a box shape, half-egg shaped, or any other shape that can use holes/apertures around its body.

Figure 2:
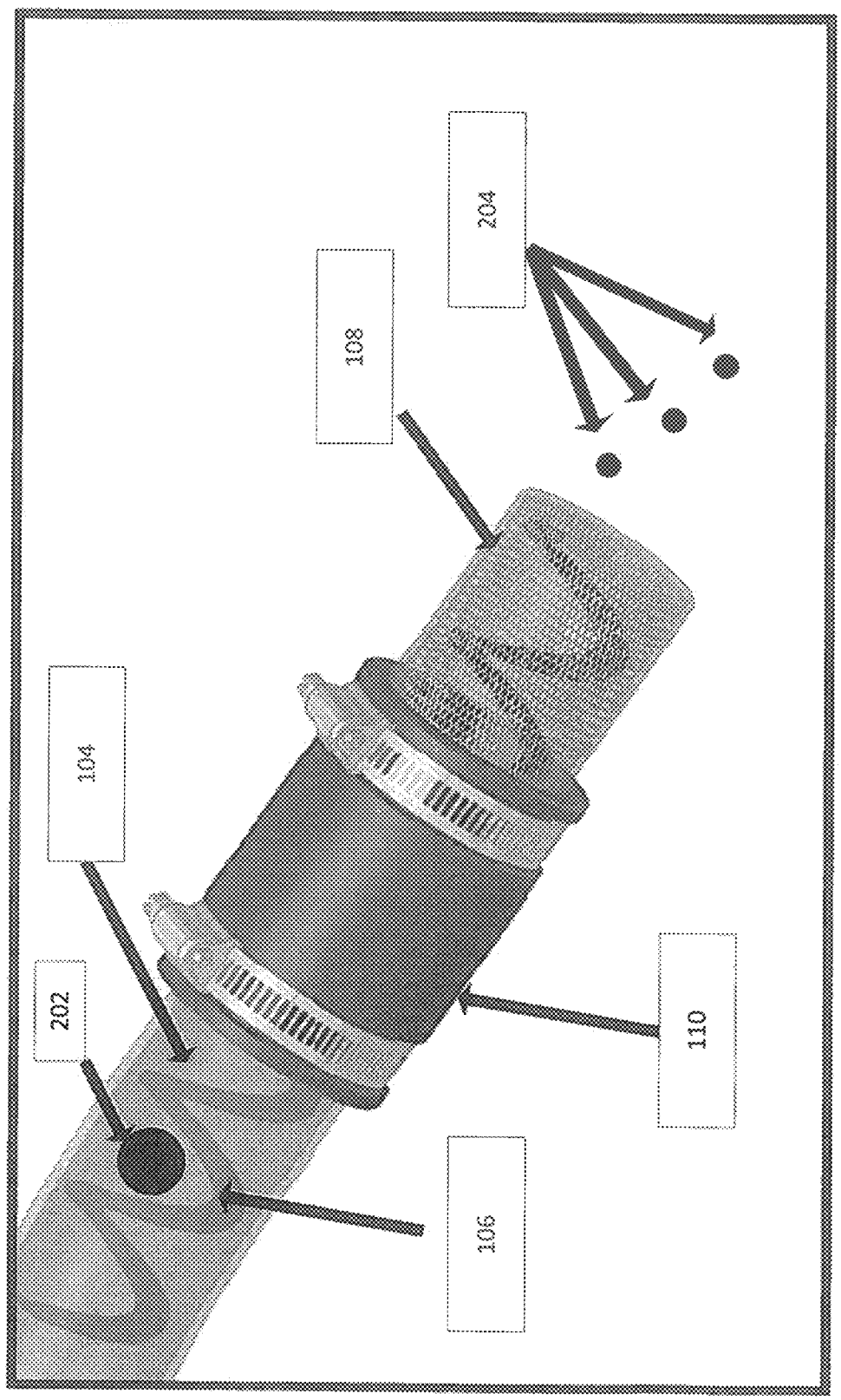
FIG. 2 is an example view of a machine in accordance with aspects of the present invention.

FIG. 2 is an example view of a flighting, a spout, and a size adjuster in accordance with aspects of the present invention. In embodiments, FIG. 2 shows spout 104, flighting 106, size adjuster 108, clumped item 202 (also referred to clumped items 202 in the plural or referred to as clumped particles of coating(s) 202), and item 204 (also referred to clumped items 204 in the plural or referred to as particle of coating(s) 204) as described in FIG. 1. As shown in FIG. 2, size adjuster 108 has holes/apertures on all sides. In embodiments, the holes/apertures can surround size adjuster 108 when a screen is used as the end and sides of size adjuster 108. In these embodiments, the screen can wrap itself around size adjuster 108 with holes/apertures the same size or of different sizes. In embodiments, size adjuster 108 can be constructed as one device or constructed as multiple devices. If size adjuster 108 is constructed as multiple devices, parts of size adjuster 108 can be interchanged with other parts so that size adjuster 108 can be used for different applications. For example, in one application, particles of coating are exiting from size adjuster 108 into a stream of seeds that requires size adjuster 108 to be located above the stream. This may require size adjuster 108 to only have holes/apertures on the end-face. Size adjuster 108 can be removed and the end-face of size adjuster 108 is detached and connected to a cylinder with no holes/apertures on the side.

Alternatively, in another example application, coated items are needed to exit from size adjuster 108 into a stream of seeds located to the sides of size adjuster 108. Thus, size adjuster 108 is required to be located near the sides of the containers. This may require size adjuster 108 to have holes/apertures on the sides and not on the end-face. Size adjuster 108 can be removed and the end-face of size adjuster 108 is replaced with an end-face that has no holes/apertures.

As shown in FIG. 2, clumped item 202 is shown in spout 104. Clumped item 202 can also be referred to as a package, aggregated items, clumped articles, clumps of discrete articles, and/or any other term. Clumped item 202 occurs when items (i.e., particles of coating) become aggregated/clumped together. In some embodiments, clumped item 202 can reach a diameter of one inch or greater. When clumped item 202 reaches size adjuster 108, flighting 106 pushes clumped item 202 through the holes/apertures of size adjuster 108. Each clumped item 202 can be reduced in size into one or more individual items 204 upon exiting size adjuster 108, if clumped item 202 is larger in size than the holes/apertures of size adjuster 108. In some embodiments, items 204 are reduced to a size near that of talcum powder (e.g., about 10 μm or 0.0004 inches in diameter). While FIG. 2 shows clumped item 202 to be a larger size than items 204, clumped item 202 can be the same or smaller size than items 204. Thus, clumped item 202 would then not be adjusted for size. Additionally, item 204 can also be referred to as individual items, articles, discrete articles, particles, products, and/or any other term.

While the above examples describe replacing parts of size adjuster 108 to accommodate different applications, size adjuster 108 can be constructed as one device with different locations for the holes/apertures.

What is claimed is:

1. A device for coating items, the device comprising:
a hopper configured to hold particles of coating;
a spout including a first end and a second end, wherein the spout is coupled to the hopper at the first end and is configured to receive the particles of coating from the hopper, and wherein the spout is flexible and has a circular cross-section;
a distribution device coupled between the hopper and the spout and configured to distribute the particles of coating from the hopper into the spout at the first end of the spout;
a size adjuster device coupled to the second end of the spout; and a fighting disposed within the spout and configured to convey the particles of coating to the size adjuster device;
wherein the size adjuster device is configured to resize the particles of coating and to discharge the particles of coating.

2. The device of claim 1, further comprising:
a motor configured to rotate the flighting, and
wherein the fighting is helical in shape.

3. The device of claim 1, wherein the size adjuster device includes a screen having one or more sides, wherein the one or more sides include a plurality of holes.

4. The device of claim 3, wherein the plurality of holes each have a same dimension.

5. The device of claim 1, wherein the distribution device is selected from the group comprising a sprayer, an injector, a nozzle, and a funnel.

6. The device of claim 1, wherein the size adjuster device is detachable.

7. A method for coating items, the method comprising:
providing a device for coating items, wherein the device includes:
a hopper configured to hold particles of coating;

a spout including a first end and a second end, wherein the spout is coupled to the hopper at the first end and is configured to receive the particles of coating from the hopper, and wherein the spout is flexible and has a circular cross-section;

wherein the plurality of particles transported from the spout to the size adjuster device are transported by means of the flighting;

a distribution device coupled between the hopper and the spout and configured to distribute the particles of coating from the hopper into the spout at the first end of the spout;

a size adjuster device coupled to the second end of the spout; and a fighting disposed within the spout and configured to convey the particles of coating to the size adjuster device;

wherein the size adjuster device is configured to resize the particles of coating and to discharge the particles of coating;

receiving in the hopper a plurality of particles of coating, wherein the particles of coating are subject to clumping together;

transporting the plurality of particles from the hopper to the spout using the distribution device;

transporting the plurality of particles from the spout to the size adjuster device;

adjusting the size of the plurality of particles using the size adjuster device; and discharging the plurality of particles.

8. The method of claim 7, wherein the device further includes:

a motor configured to rotate the flighting, and wherein the fighting is helical in shape.

9. The method of claim 7, wherein the size adjuster device includes a screen having one or more sides, wherein the one or more sides include a plurality of holes, and wherein adjusting the size of the plurality of particles includes passing the plurality of particles through the plurality of holes in the screen of the size adjuster device.

10. The method of claim 9, wherein the plurality of holes each have a same dimension.

11. The method of claim 7, wherein the distribution device is selected from the group comprising a sprayer, an injector, a nozzle, and a funnel.

12. The method of claim 7, wherein the size adjuster device is detachable.

* * * * *

UNITED STATES PATENT AND TRADEMARK OFFICE
CERTIFICATE OF CORRECTION

PATENT NO.         : 9,930,825 B2                                  Page 1 of 1
APPLICATION NO.    : 14/887038
DATED              : April 3, 2018
INVENTOR(S)        : Michael J. Hilvers It is certified that error appears in the above-identified patent and that said Letters Patent is hereby corrected as shown below:

Column 6, Claim 1, Line 45:    replace "fighting" with --flighting--.

Column 6, Claim 2, Line 53:    replace "fighting" with --flighting--.

Column 7, Claim 7, Line 14:    replace "fighting" with --flighting--.

Column 8, Claim 8, Line 9:     replace "fighting" with --flighting--.

Signed and Sealed this
Fifteenth Day of May, 2018

Andrei Iancu
*Director of the United States Patent and Trademark Office*